United States Patent
Coss, Jr. et al.

(10) Patent No.: US 7,200,779 B1
(45) Date of Patent: Apr. 3, 2007

(54) FAULT NOTIFICATION BASED ON A SEVERITY LEVEL

(75) Inventors: Elfido Coss, Jr., Austin, TX (US); Susan Hickey, Austin, TX (US); Michael R. Conboy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 510 days.

(21) Appl. No.: 10/133,097

(22) Filed: Apr. 26, 2002

(51) Int. Cl.
*G06F 11/00* (2006.01)

(52) U.S. Cl. ............................ 714/48; 714/47; 714/57; 700/108; 700/110

(58) Field of Classification Search ................. 714/48, 714/47, 57; 700/108, 109, 110
See application file for complete search history.

(56) References Cited

U.S. PATENT DOCUMENTS

| | | | | |
|---|---|---|---|---|
| 5,062,147 A * | 10/1991 | Pickett et al. | ................. | 714/46 |
| 5,163,151 A * | 11/1992 | Bronikowski et al. | ........ | 714/57 |
| 5,513,343 A * | 4/1996 | Sakano et al. | ................ | 714/26 |
| 5,748,884 A * | 5/1998 | Royce et al. | ................. | 714/57 |
| 5,905,989 A * | 5/1999 | Biggs | ....................... | 707/104.1 |
| 6,006,016 A * | 12/1999 | Faigon et al. | ................ | 714/48 |
| 6,115,643 A * | 9/2000 | Stine et al. | ................. | 700/110 |
| 6,219,648 B1 * | 4/2001 | Jones et al. | .................... | 705/8 |
| 6,314,328 B1 * | 11/2001 | Powell | ....................... | 700/80 |
| 6,363,294 B1 * | 3/2002 | Coronel et al. | ............ | 700/121 |
| 6,684,121 B1 * | 1/2004 | Lu et al. | ..................... | 700/108 |
| 6,766,208 B2 * | 7/2004 | Hsieh | ........................ | 700/109 |
| 6,778,893 B2 * | 8/2004 | Murakami et al. | ............ | 701/50 |
| 6,832,341 B1 * | 12/2004 | Vijayan | ..................... | 714/43 |
| 6,961,878 B2 * | 11/2005 | Kirkpatrick et al. | ........... | 714/57 |
| 7,076,688 B2 * | 7/2006 | Yamamoto | ..................... | 714/6 |
| 2003/0109951 A1* | 6/2003 | Hsiung et al. | ............... | 700/108 |
| 2004/0029029 A1* | 2/2004 | Atkinson et al. | ............. | 430/30 |

* cited by examiner

*Primary Examiner*—Marc Duncan
(74) *Attorney, Agent, or Firm*—Williams, Morgan & Amerson, P.C.

(57) ABSTRACT

A method and apparatus is provided for fault notification based on a severity level. The method comprises detecting a fault associated with a processing tool that is adapted to process one or more workpieces, determining a fault severity level of the detected fault and selecting at least one user to notify of the fault based on the severity level of the fault.

1 Claim, 8 Drawing Sheets

| Fault Identifier ⌐520(1) | Date/Time ⌐520(2) | Impact ⌐520(3) | Severity Level ⌐520(4) |
|---|---|---|---|
| 123098 | 11:02:35 on 01/01/02 | Tool Inoperable | Very high |
| 321890 | 1:03:05 on 01/02/02 | Alert | High |
| 456534 | 11:00:00 on 01/04/02 | Chemical supply low | Medium |
| 567577 | 10:02:35 on 01/05/02 | Broken workpiece | High |
| 876543 | 9:02:35 on 01/07/02 | Alert | Very Low |
| ••• | ••• | ••• | ••• |

| Recipient | Notification Conditions |
|---|---|
| Recipient#1 | High |
| Recipient#2 | All severities |
| Recipient#3 | Very high |
| Recipient#4 | All severities |
| ... | ... |

FAULT NOTIFICATION BASED ON A SEVERITY LEVEL

BACKGROUND OF THE INVENTION

1. Field of the Invention

This invention relates generally to a semiconductor fabrication process, and, more particularly, to providing notification of faults detected in the semiconductor fabrication process based on a severity level associated with the faults.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Semiconductor manufacturing processes, which have become more reliable and robust over the past few years, may include a plurality of processing tools that cooperate with each other to process semiconductor devices, such as microprocessors, memory devices, ASICs, etc. To verify that the processing tools are operating within acceptable parameters, it has become increasingly desirable to monitor the operating conditions of such processing tools.

Today's semiconductor manufacturing processes may include an intricate network of multiple processing tools for manufacturing semiconductor devices. While the benefits of linking multiple processing tools are inherently obvious, there can, however, be some drawbacks, particularly from the standpoint of troubleshooting problems or faults, and then timely notifying the appropriate personnel so that corrective action may be taken. Failing to notify the appropriate personnel of the detected faults in a timely manner may naturally delay any potential corrective measures that can be taken to address the problem. Because of these delays, the operation of the semiconductor manufacturing process may be adversely affected, thereby resulting in a potential increase in costs for the manufacturer and consumer.

The present invention is directed to overcoming, or at least reducing the effects of, one or more of the problems set forth above.

SUMMARY OF THE INVENTION

In one embodiment of the present invention, a method is provided for fault notification based on a severity level. The method comprises detecting a fault associated with a processing tool that is adapted to process one or more workpieces, determining a fault severity level of the detected fault and selecting at least one user to notify of the fault based on the severity level of the fault.

In another embodiment of the present invention an apparatus is provided for fault notification based on a severity level. The apparatus comprises a control unit communicatively coupled to a storage unit. The storage unit is adapted to store a first contact and a second contact. The control unit is adapted to receive information related to faults from a processing tool, the faults having at least one of a first fault severity level and a second fault severity level associated therewith and transmit the information related to the faults of the first fault severity level to the first contact and the information related to the faults of the second fault severity level to the second contact.

In a further embodiment of the present invention, an article comprising one or more machine-readable storage media containing instructions is provided for fault notification based on a severity level. The one or more instructions, when executed, enable the processor to detect a fault associated with a processing tool that is adapted to process one or more semiconductor devices, determine a fault severity level of the detected fault and select at least one user to notify of the fault based on the severity level of the fault. The instructions further enable the processor transmit information related to the fault to the at least one selected user.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
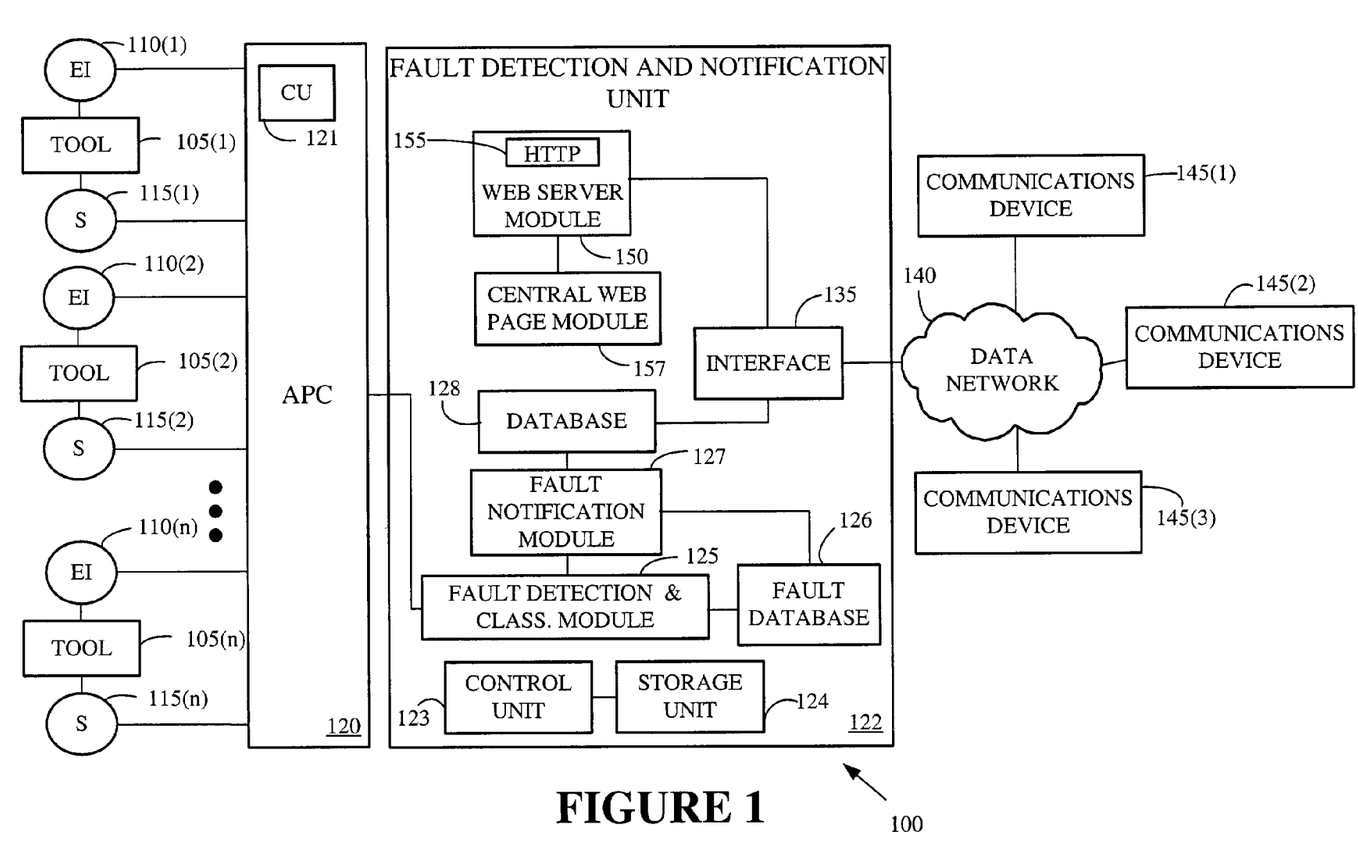
FIG. 1 illustrates a manufacturing system, including an APC framework, in accordance with one embodiment of the present invention.

Turning now to the drawings, and specifically referring to FIG. 1, a block diagram of a manufacturing system 100 for a semiconductor fabrication process is illustrated in accordance with one embodiment of the present invention. Although the invention is described as it may be implemented in a semiconductor fabrication facility, the invention is not so limited and may be applied to other manufacturing environments. The techniques described herein may be applied to a variety of workpieces including, but not limited to, microprocessors, memory devices, digital signal processors, application specific integrated circuits (ASICs), or other similar devices. The techniques may also be applied to workpieces other than semiconductor devices.

The system 100 includes a plurality of processing tools 105(1–n). In the illustrated embodiment, the processing tools 105(1–n) are coupled to respective equipment interfaces (EI) 110 (shown as EI 110(1–n) in FIG. 1). Each of the equipment interfaces 110 retrieves various operational data from its respective processing tool 105, and communicates this data to an Advanced Process Control (APC) framework 120 to determine whether the processing tool 105 is experiencing a faulty operation. Each equipment interface 110 may further receive control signals from the APC framework 120 that may be used to control the respective processing tool 105. For example, a control signal from the APC framework 120 may be used to shut down the first processing tool 105(1) if the operational data that was sent by the first equipment interface 110(1) was deemed faulty by the APC framework 120. As utilized herein, the term "operational data" may include metrology data.

Exemplary processing tools 105(1–n) for a semiconductor device fabrication environment include photolithography steppers, etch tools, deposition tools, polishing tools, rapid thermal processing tools, test-equipment tools, implantation tools, etc. In one embodiment, the processing tool 105 may be a multi-chambered processing tool, where, for example, each chamber may represent a "processing tool" for the purposes of this discussion. A processing tool 105, in one embodiment, may be a metrology tool that provides metrology data through its associated equipment interface 110 based on the lot of wafers received by the processing tool 105. A metrology tool may measure a variety of parameters related to the wafers that have been processed by the processing tool 105, parameters such as critical dimensions, layer-to-layer overlay, film thickness, and the like.

In one embodiment, the processing tools 105(1–n) may be downstream to each other. That is, the second processing tool 105(2) may be downstream to the first processing tool 105(1), the third processing tool 105(3) may be downstream to the second processing tool 105(2), and so forth. As such, a workpiece that is processed by the first processing tool 105(1) may, for example, be provided to the second processing tool 105(2), which may further process the workpiece before it is processed by the next processing tool 105(3). This process may continue until the last processing tool 105(n) has completed processing the workpiece.

The processing tools 105(1–n) of the system 100, in the one embodiment, may perform various processing steps to create a packaged semiconductor device. For example, the processing tools 105(1–n) may be used for manufacturing the raw semiconductor material, slicing the semiconductor crystal ingot into individual wafers, fabricating (e.g., etching, doping, ion implanting) the wafers, testing and packaging the completed semiconductor devices. The number of processing tools 105(1–n) employed in the system 100 may be implementation specific, and thus may vary from one embodiment to another depending on the particular processing steps desired.

Generally, each processing tool 105 performs selected processing steps in accordance with the recipe defined for the workpiece to be processed in the processing tool 105. In one embodiment, the processing tool 105 may have more than one recipe associated therewith. For example, a processing tool 105 may perform selected processing steps on one workpiece according to a first recipe, and other processing steps on another workpiece according to a second recipe. Several discrete processes may be involved in semiconductor manufacturing, and, as such, multiple manufacturing processing tools 105(1–n) may be utilized to process the workpiece before arriving at the final product.

The APC framework 120 may be any one of a variety of arrangements that facilitates communications to and from the processing tools 105(1–n). In one embodiment, the APC framework 120 may include a control unit 121 that manages the communications to and from the APC framework 120. The control unit 121 may also control the overall operations of one or more of the processing tools 105(1–n).

The processing tools 105(1–n) may include one or more internal sensors (not shown) for measuring operational data, which may then be transmitted through the associated EI 110 of the processing tools 105(1–n). In additional to internal sensors, the processing tools 105 may also be coupled to respective external sensors 115(1–n). The sensors 115(1–n) measure additional operational data that may or may not be ascertained by the associated processing tool 105 itself. For example, the sensor 115 may be used to determine a temperature range or other environmental or ambient data near or around the associated processing tool 105. In alternative embodiments, the sensor 115 may be used to sense various other operational parameters associated with the processing tool 105, and, thus, need not be limited to the aforementioned examples. It should be appreciated that, in one embodiment, some or all of the features of the sensors 115(1–n) may be integrated within the processing tools 105(1–n) themselves.

The sensor 115 may be embodied as a simple data acquisition program, such as a C++ standalone program acquiring data from a thermocouple wire, for example. Alternatively, the sensor 115 may be embodied as a full-fledged LABVIEW application, acquiring data through multiple transducers (not shown). It will further be appreciated that the sensor 115 need not be used at all, and the APC framework 120 may rely upon the operational data forwarded from the processing tool 105. If used, in one embodiment, the sensor 115 forwards the additional operational data to the APC framework 120 for analysis.

The system 100 includes a fault detection and notification unit 122 having a control unit 123 and a storage unit 124. The fault detection and notification unit 122, which in the illustrated embodiment includes a fault detection and classification module 125 and a fault notification module 127, receives the operational data associated with the processing tools 105, processes the data to determine if a fault occurred in the manufacturing system 100, determines a severity level of the fault, if detected, and notifies the appropriate personnel upon detecting the fault based on the determined fault severity level. For the purposes of this discussion, the operational data that is associated with the processing tool 105 may be received through the EI 110 or the sensor 115 or any other desirable source.

The fault detection and classification module 125 stores fault classification related information in a fault database 126, an example of which is provided later in FIG. 5. As described in more detail below, in one embodiment, the fault detection and notification unit 122 may increase the determined fault severity level of detected faults in response to an occurrence of selected conditions and then notify the appropriate personnel based on the new fault severity level.

The fault detection and notification unit 122, which is coupled to the APC framework 120, receives the operational data of the processing tool 105 via the APC framework 120. In one embodiment, the operational data provided to the fault detection and notification unit 122 via the APC framework 120 may include a date and time stamp that may be utilized by the fault detection and classification module 125 to determine at least an approximate (if not substantially the exact) time and date the fault occurred in the processing tool 105. Prior to sending the operational data to the fault detection and notification unit 122, the APC framework 120 may, in one embodiment, translate the operational data to a format that is recognizable by the fault detection and notification unit 122. In an alternative embodiment, the fault detection and notification unit 122 may be integrated into the APC framework 120, and, as such, the translation of the operational data to a format that is recognizable by the fault detection and notification unit 122 may not be necessary.

In accordance with one embodiment, the fault detection and classification module 125 includes a commercially available software package, such as ModelWare, for example, that provides fault detection analysis of the processing tools 105. It will be appreciated, however, that other types of commercially available fault detection software may also be used in lieu thereof without departing from the spirit and scope of the present invention.

As mentioned, the fault detection and notification unit 122, in the illustrated embodiment, includes the fault notification module 127. The fault notification module 127, based on the faults detected by the fault detection and classification module 125, notifies one or more recipients identified in a database 128 based on the determined severity level of the faults, as described in more detail below. The database 128, in one embodiment, may be any one of a variety of available databases, including, but not limited to, commercially available databases from Microsoft® and IBM®. Alternatively, the database 128 may be a compilation of information that is stored in a data file and is accessible by the fault notification module 127.

The fault detection and classification module 125 of the fault detection and notification unit 122, in one embodiment, compares the received operational data from the APC framework 120 to fault model data. The fault model data includes operational data of other similar-type tools, where it was previously known that such tools had operated within acceptable operational limits. The types of faults that may be detected by the fault detection and classification module 125 include processing and/or operational faults in fabrication. Examples of processing faults, in the context of semiconductor manufacturing, may include, but are not necessarily limited to, non-optimal preheating of the chamber, catastrophic failure where a broken wafer is detected, abnormal nitrogen (N2) flow rate, temperature overshoots at the top of a ramp, tube temperature measurement drifts, excessive pressures, etc. Examples of operational faults detected by the fault detection and classification module 125 may include, in the context of semiconductor manufacturing, interrupted/resumed processing, or improper wafer sleuth prior to Rapid Thermal Anneal (RTA), etc. Thus, what constitutes a "fault" may vary depending upon the type of workpieces processed and the nature of the processing operation performed in the processing tool 105. Furthermore, as utilized herein, the term "fault" may include any undesirable condition associated with the processing tool 105, and may include errors or alerts that are generated or received as a result of an occurrence of the undesirable condition.

The fault detection and notification unit 122, in the illustrated embodiment, includes an interface 135 that provides the communications interface to a data network 140. The data network 140 may be a packet-switched data network, such as a data network according to the Internet Protocol (IP). Examples of the data network 140 include local area networks (LANs), wide area networks (WANs), intranets, and the Internet. One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 140 may also include other types of packet-based data networks in further embodiments. Examples of such other packet-based data networks include Asynchronous Transfer Mode (ATM) and Frame Relay networks. As utilized herein, a "data network" may refer to one or more communications networks, channels, links, or paths, and systems or devices (such as routers) used to route data over such networks, channels, links, or paths.

Associated with the interface 135 may be a network protocol stack (not shown), with one example being a UDP/IP (User Datagram Protocol/Internet Protocol) stack. UDP is described in RFC 768, entitled "User Datagram Protocol," dated August 1980. In one embodiment, both inbound and outbound packets may be passed through the interface 135.

In the exemplary arrangement of FIG. 1, the fault notification module 127 may be communicatively coupled to a plurality of communications devices 145(1–3) via the data network 140. It should be appreciated, however, that in an alternative embodiment, the fault notification module 127 may communicate with one or more of the communications devices 145(1–3) over mediums without the intervening data network 140. As such, the fault detection and notification unit 122 may include interfaces that are adapted to facilitate communications with the various types of communications devices 145(1–3). Although not shown in FIG. 1, in one embodiment, the communications devices 145(1–3) may communicate with the fault detection and notification unit 122 through an Internet service provider.

The communications device 145 may be any suitable device that is capable of receiving and displaying the fault-related information that is transmitted by the fault notification module 127. Examples of the communications device 145 may include a data processing system, a telephone, and a wireless communications device in the form of a personal digital assistant, cellular telephone, pager, and the like.

The fault detection and notification unit 122, in one embodiment, includes a web server module 150, which may be capable of receiving requests over the data network 140 and responding to such requests. For example, the web server module 150 may include an HTTP (Hypertext Transfer Protocol) service routine 155 that is capable of receiving HTTP requests over the data network 140, as well as sending HTTP responses over the data network 140. The Hypertext Transfer Protocol specifies how a client and server may establish a connection, how the client may request data from the server, how the server may respond to the request, and how the connection may be closed. One version of HTTP is described in RFC 2068, entitled "Hypertext Transfer Protocol—HTTP/1.1," dated January 1997. In one embodiment, the web server module 150 and the HTTP service routine 155 may be stored in the storage unit 124 or in another storage unit (not shown).

The storage unit 124, in one embodiment, may include a central web page module 157 that, as explained below, allows users to access useful information pertinent to the processing tools 105(1–n). The information may be presented to the user in a graphical format, in one embodiment, thereby allowing users to view fault related information, for example, regarding one or more of the processing tools 105(1–n). The central web page module 157, in one embodiment, may include a hypertext markup language (html) file and may include an executable script that is able to retrieve the desired information for the processing tools 105(1–n). The term "module," as utilized herein, may be implemented in hardware, software, or a combination thereof. The modules 125, 127, 157 if implemented in software, may be storable in the storage unit 124.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the one or more processing tools 105 may not have an external sensor 115. Additionally, it should be noted that although various components, such as the equipment interface 110 of the system 100 of FIG. 1 are shown as stand-alone components, in alternative embodiments, such components may be integrated into the processing tool 105. Similarly, the fault detection and notification unit 122 may be integrated into the APC framework 120.

Figure 2:
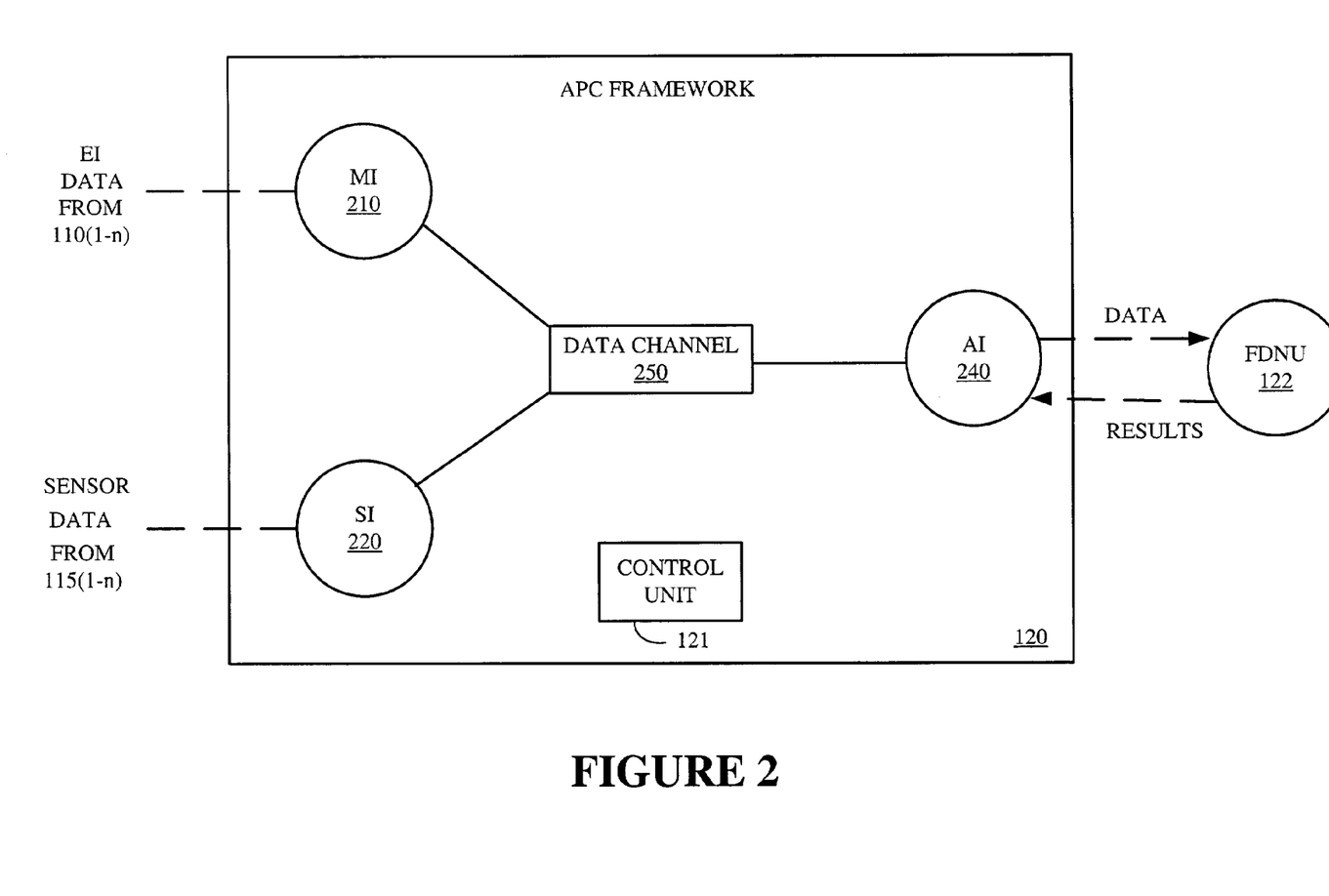
FIG. 2 illustrates a block diagram of the APC framework of FIG. 1, in accordance with one embodiment of the present invention.

Turning now to FIG. 2, a more detailed representation of the APC framework 120 is provided. The APC framework 120 is a component-based architecture comprised of interchangeable, standardized software components enabling run-to-run control and fault detection of the processing tool 105. The APC framework 120 includes a machine interface (MI) 210 for communication with the processing tool 105 and the APC framework 120 to collect operational data therefrom. The APC framework 120 further includes a sensor interface (SI) 220 for communication between the sensor 115 and the APC framework 120. The sensor interface 220 also collects operational data of the processing tool 105 through the sensor 115. The APC framework 120 further includes an applications interface (AI) 240 for interfacing with third-party applications that run on the fault detection and classification module 125 to analyze the operational data received via the machine and sensor interfaces 210, 220. In the illustrated embodiment, the third-party application is the fault detection and notification unit 122. A data channel 250 is further provided to allow for communication of data from the machine and sensor interfaces 210, 220 and the applications interface 240 of the APC framework 120.

The machine interface (MI) 210 couples to the equipment interface 110 to serve as an interface between the processing tool 105 and the APC framework 120. The machine interface 210 supports the setup, activation, monitoring, and data collection of the processing tool 105. The machine interface 210 receives commands, status events, and collected data from the equipment interface 110 and forwards this information to other components of the APC framework 120, namely the applications interface 240. Any responses that are received by the machine interface 210 from the other components of the APC framework 120 are routed to the equipment interface 110 for delivery to the processing tool 105. As previously discussed, this may include a control signal from the fault detection and notification unit 122 (see FIG. 1) to manipulate the processing tool 105 if a faulty condition is detected.

The machine interface 210 may also reformat and restructure the messages between the specific communications protocol utilized by the equipment interface 110 and the Common Object Request Broker Architecture Interface Definition Language (CORBA IDL) communications protocol used by the components of the APC framework 120. The manner in which the machine interface 210 performs such translation between the equipment interface-specific communications protocol and the CORBA IDL protocol of the APC framework 120 is well known to those of ordinary skill in the art. Accordingly, the specific translation process between these two formats will not be discussed herein to avoid unnecessarily obscuring the present invention.

The sensor interface 220 is coupled to the sensor 115 and serves as an interface between the sensor 115 and the APC framework 120. The sensor interface 220 provides setup, activation, monitoring, and data collection for the sensor 115. Similar to the machine interface 210, the sensor interface 220 may also reformat and restructure the messages between the specific communications protocol utilized by the sensor 115 and the CORBA IDL protocol used by the components of the APC framework 120.

The applications interface 240 supports the integration of third-party tools (e.g., commercial software packages, such as ModelWare, MatLab, and Mathematica, for example) to the APC framework 120. Typically, these third-party tools do not provide the standard CORBA IDL protocol known to the APC framework 120. Accordingly, the applications interface 240 provides the necessary translation between the communications protocol utilized by the third-party tool and the CORBA protocol used by the APC framework 120.

Figure 3:
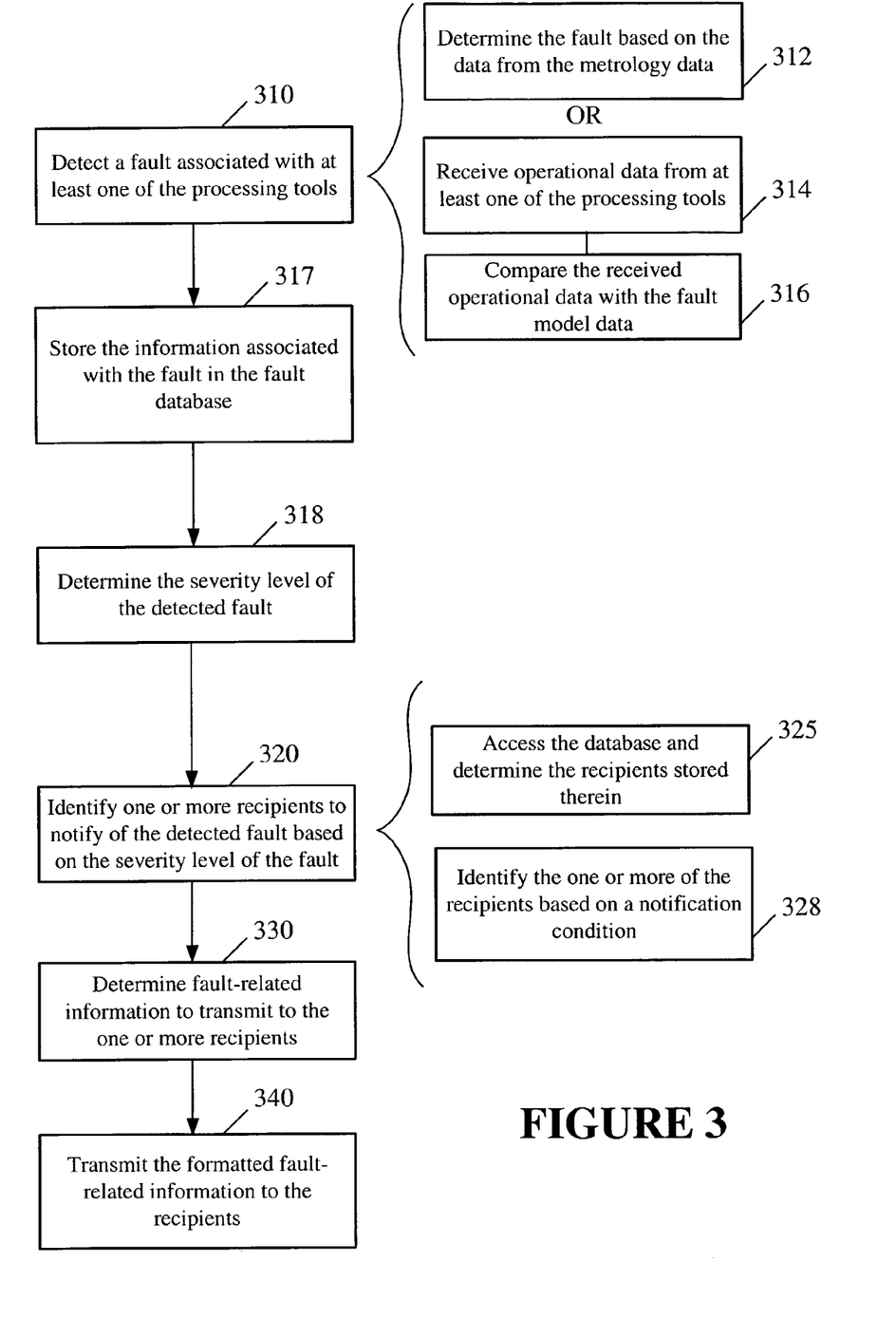
FIG. 3 illustrates a flow diagram of a method that may be implemented in the manufacturing system of FIG. 1 to transmit fault-related information based on a fault severity level, associated with a fault in accordance with one embodiment of the present invention.

Referring now to FIG. 3, a flow diagram of a method that may be implemented in the manufacturing system 100 of FIG. 1 is illustrated, in accordance with one embodiment of the present invention. The fault detection and notification unit 122 detects (at 310) a fault associated with at least one of the processing tools 105(1–*n*). The fault may be detected (at 310) in any one of a variety of ways. In one embodiment, assuming that metrology data is received from one of the processing tools 105(1–*n*), the fault detection and classification module 125 may determine (at 312) the fault based on the received metrology data. That is, a fault may, for example, be detected if the metrology data indicates that the measured parameters of the workpieces are outside the range of acceptable parameters. In another embodiment, the fault may be detected (at 310) based on the fault detection and classification module 125 receiving (at 314) operational data from at least one of the processing tools 105(1–*n*) and comparing (at 316) the received operational data with the fault model data. As mentioned earlier, a variety of faults may be detected in the manufacturing system 100, including processing faults and operational faults.

The fault detection and classification module 125, in one embodiment, stores (at 317) information that is associated with the detected fault, such as a fault identifier, in the fault database 126. The "fault identifier" may be any information that identifies the detected fault (at 310), and may include information such as a fault code, for example, associated with the detected fault. In one embodiment, the time and date of the occurrence or detection of the fault may also be stored in the fault database 126. An example of the fault database 126 is provided below in FIG. 5.

Referring again to FIG. 3, the fault detection and classification module 125 determines (at 318) a severity level of the fault that is detected (at 310). The severity level of the fault may be determined (at 318) in a variety of ways, described in more detail below. In one embodiment, the severity level of the fault may be determined (at 318) based on the impact of the fault on the operation of the processing tool 105. In another embodiment, the severity level of the fault may be determined (at 318) based on the number of times a fault is detected within a selected period. Other ways of determining the fault severity levels of the detected faults are described later. In one embodiment, a variety of fault severity levels may be assigned to the detected faults, such as a "very high" severity, "high" severity, "medium" severity, "low" severity, "very low" severity, and the like. In an alternative embodiment, the severity level may be assigned to the faults based on a numeric scale, such as, for example, a scale of 1 to 10, where the fault severity level "1" may represent the highest level of severity and the fault severity level "10" may represent the lowest level of severity.

The fault notification module 127 identifies (at 320) one or more recipients to notify of the detected fault (at 310). In one embodiment, the fault notification module 127 may identify the recipients (at 320) by accessing (at 325) the database 128 (described below in FIG. 6) and determining the recipients listed therein. Thus, in one embodiment, all of the recipients identified in the database 128 may be notified of the fault detected (at 310) by the fault notification module 127. In an alternative embodiment, the fault notification module 127 may identify (at 328) the recipients based on a notification condition that is associated with each of the recipients. The "notification condition," for example, may dictate notifying selected recipients of the detected fault based on the determined severity level of the fault. Thus, for instance, a first group of recipients may be notified of faults having only the associated fault severity level of "high severity", while another group of recipients may be notified of faults that only have an associated fault severity level of "low" to "medium" and yet another group of recipients may be notified of all the faults regardless of the associated fault severity level. Of course, the precise manner of associating faults and the fault severity level to the appropriate recipients is a matter of design choice, and thus may vary from one implementation to another.

The fault notification module 127 determines (at 330) the fault-related information to transmit to the one or more recipients identified (at 320). The term "fault-related information," as utilized herein, refers to information that is pertinent to the detected fault, and thus, may include information such as the processing tool 105 with which the fault is associated, fault identifier, the time and location of the fault, the impact of the fault, the determined severity level of the fault, list of other intended recipients, and the like. The fault detection and notification unit 122 transmits (at 340) the fault-related information determined (at 330) to each of the identified recipients (at 320). In one embodiment, the fault-related information may be transmitted to another processing tool 105 that may also be affected by the fault.

Figure 4:
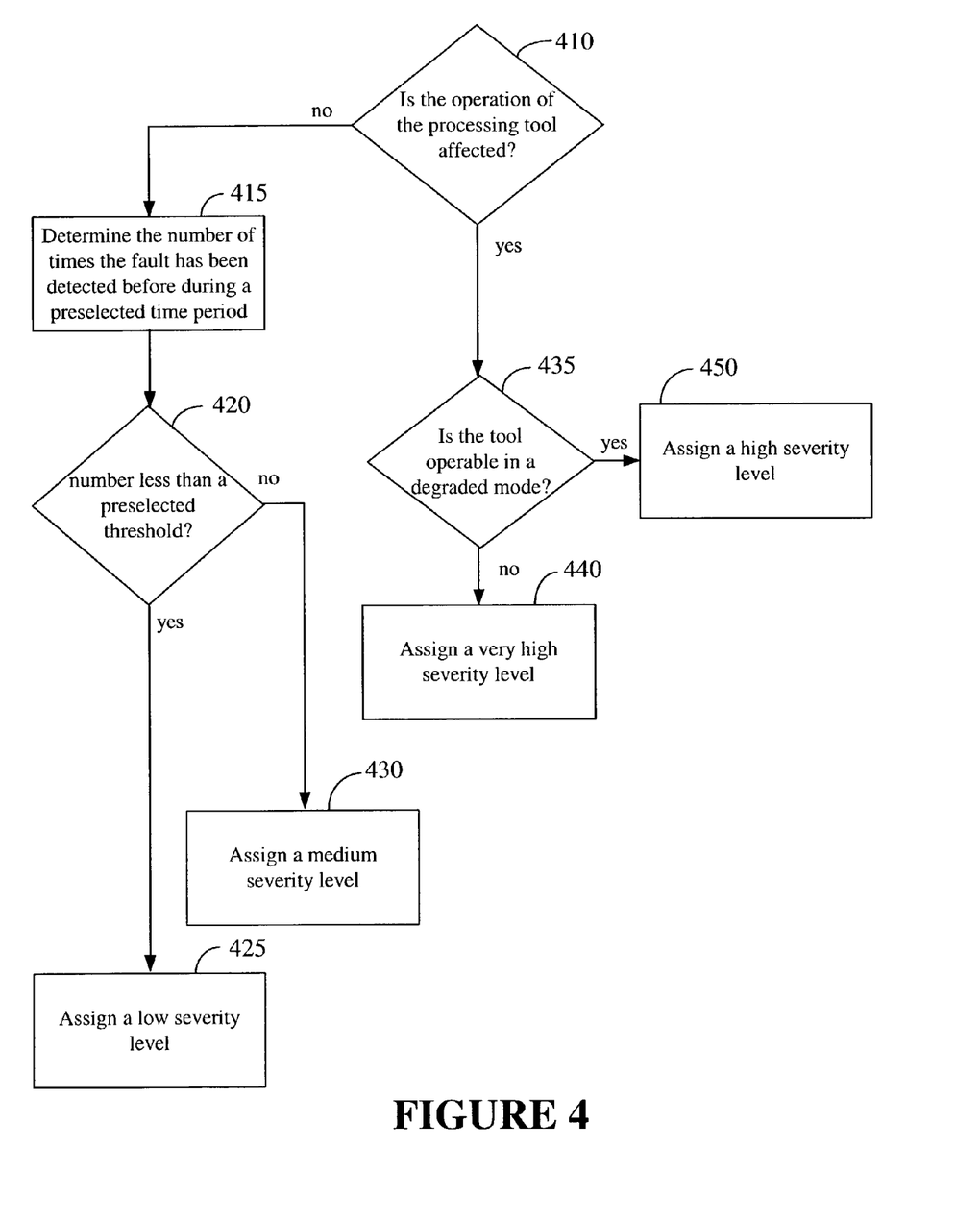
FIG. 4 illustrates a flow diagram of a method of assigning a fault severity level to a detected fault in the manufacturing system of FIG. 1, in accordance with one embodiment of the present invention.

Referring now to FIG. 4, a flow diagram of a method for determining the fault severity level of a detected fault is illustrated, in accordance with one embodiment of the present invention. The fault detection and classification module 125 determines (at 410) whether the operation of the processing tool 105 is affected by the occurrence of the fault. It may be possible that not all faults affect the operation of the processing tool 105, particularly faults that comprise alerts or informative messages that inform of potential future problems (e.g., a chemical supply is low, a preventative maintenance is desired) rather than faults that reflect current operational problems. If it is determined (at 410) that the operation of the processing tool 105 is not affected, then the fault detection and classification module 125 determines (at 415) the number of times the fault has been detected previously during a preselected time period. The preselected time period may be, for example, a 24-hour period, or it may be any other desirable time interval.

Based on the number of detections (at 415) of the fault during the preselected time period, the fault detection and classification module 125, in one embodiment, determines the fault severity level that is associated with the fault. For example, if the fault detection and classification module 125 determines (at 420) that the number of detections is less than a preselected threshold, then the fault may be assigned (at 425) a "low" fault severity level (relative to other faults) because the fault does not affect the operation of the processing tool 105 (see block 410) and has been detected less than the number of times defined by the preselected threshold value (see block 420) within the preselected time period (see block 415). If, however, it is determined (at 420) that the number of detections is greater than the preselected threshold, then the fault, in one embodiment, may be assigned (at 430) a relatively higher (e.g., "medium") fault severity level.

If the fault detection and classification module 125 determines (at 410) that the detected fault affects the operation of the processing tool 105, then the fault detection and classification module 125 determines (at 435) whether the processing tool 105 is operable in a degraded mode. If it is determined (at 435) that the processing tool 105 is not capable of being operated in the degraded mode, then, in one embodiment, the fault may be assigned (at 440) a "very high" fault severity level, in part, because the processing tool 105 may be completely inoperable. If, however, it is determined (at 435) that the processing tool 105 may be operated in the degraded mode, then the fault detection and classification module 125 may assign (at 450) less than the maximum fault severity level, such as a "high" fault severity level as opposed to a "very high" fault severity level to the fault. The fault severity level assigned to the faults may be stored in the fault database, in one embodiment, as shown in FIG. 5.

Figure 5:
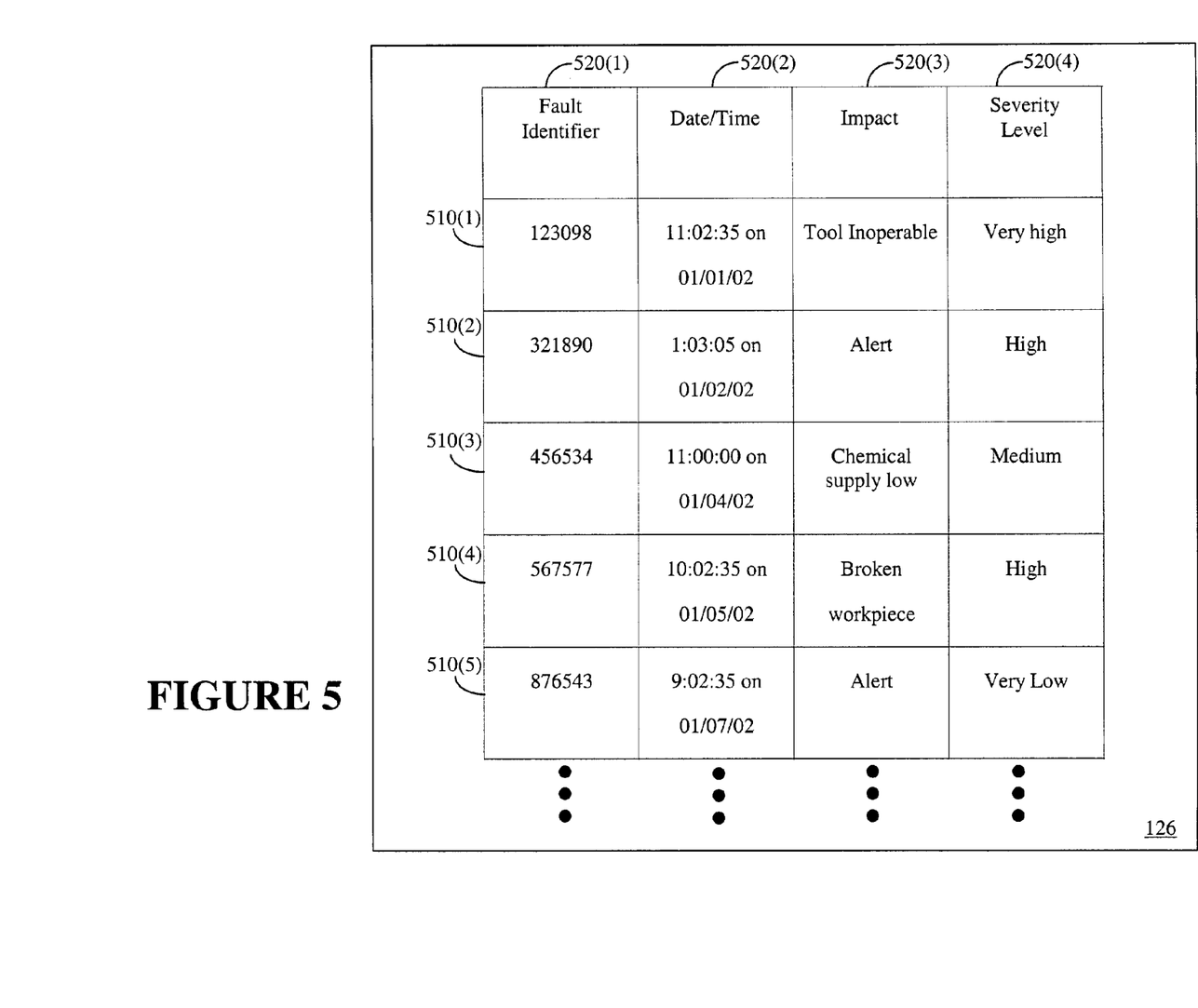
FIG. 5 illustrates an exemplary fault database for storing detected faults and the associated fault severity levels in the manufacturing system of FIG. 1, in accordance with one embodiment of the present invention.

Referring now to FIG. 5, the fault database 126 with exemplary fault-related contents stored therein is illustrated. The fault database 126 may include a plurality of entries 510(1–5), where each detected fault is stored in the entry 510. Each entry 510 may include a plurality of fields 520(1–4), where, in the illustrated embodiment, the first field 520(1) includes a fault identifier for the fault that is detected by the fault detection and classification module 125, and the second field 520(2) includes the time and date the fault is detected. In the illustrated embodiment, the third field 320(3) identifies the impact of the detected fault on the processing tool 105, and the fourth field 320(4) indicates the fault severity level to the detected fault. The fault severity level may be determined, for example, using the method illustrated in FIG. 4.

The contents depicted in the fault database 126 of FIG. 5 are exemplary in nature. In the illustrated example, the first entry 510(1) of the fault database 126 indicates that the detected fault having an identifier of "123098" was detected at "11:02:35" on "01/01/02" (see the second field 520(2)), where the fault rendered the processing tool 105 inoperable (see the third field 520(3)) and that the fault has been assigned a "very high" fault severity level (see the fourth field 520(4)). As an additional example, the second entry 510(2) of the fault database 126 indicates that a fault having an identifier of "321890" was detected at "1:03:05" on "01/02/02," and that the fault is an alert and has been assigned a "high" fault severity level. In the illustrated example, the alert identified in the second entry 510(2) may have a "high" fault severity level associated with it because the fault detection and classification module 125 may have detected multiple occurrences of the fault in the fault database 126 within the preselected time period. The remaining entries 510(3–5) contain additional data for illustrative purposes. It should be appreciated that the fault database 126 may employ additional or fewer fields 320(1–4) in other embodiments, depending on the implementation needs.

Figure 6:
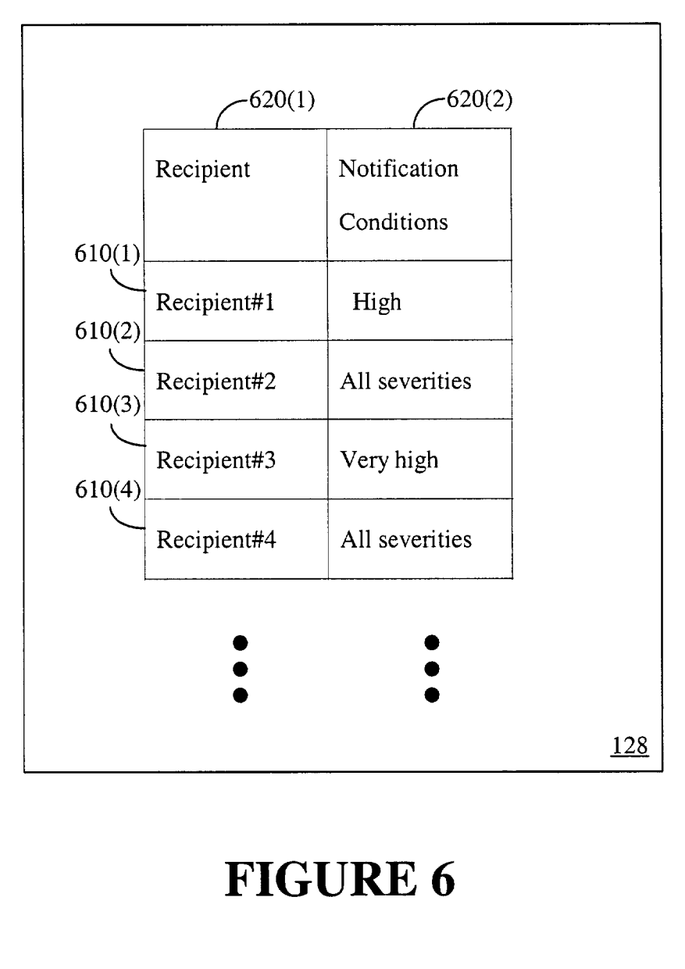
FIG. 6 illustrates an exemplary database identifying one or more recipients to be notified of detected faults in the manufacturing system of FIG. 1, in accordance with one embodiment of the present invention.

Referring now to FIG. 6, the database 128 with exemplary contents stored therein is illustrated. The database 128, in the illustrated embodiment, includes a plurality of entries 610(1–4), with each entry 610 having a plurality of associated fields 620(1–2). In the disclosed embodiment, each entry 610 includes a name of the recipient that is identified in the first field 620(1), and notification conditions associated with that recipient that are identified in the second field 620(2).

As mentioned, the fault notification module 127, based on the contents of the database 128, notifies the appropriate recipients of the detected fault based on the associated fault severity level according to notification conditions associated with the recipient. Thus, for example, with respect to the first entry 610(1), the fault notification module 127 notifies Recipient#1 of detected faults having a "high" or greater associated fault severity level. Recipient#2 of the second entry 610(2), for example, is configured to receive notifications of all faults, regardless of the associated fault severity level of those faults. Similarly, other recipients identified in the first field 620(1) of the remaining entries 610(3–4) receive fault notifications according to the notification conditions specified in the second field 620(2) of the respective entries 610(3–4). By way of example, a fault that is detected and assigned a "high" fault severity level is transmitted, according to the illustrated database 128 of FIG. 6, to Recipient#1, Recipient#2, and Recipient#4, but not to Recipient#3 (who is configured to receive faults that only have a "very high" fault severity level).

As shown, each recipient identified in the first field 620(1) may have a different notification condition 620(2) associated therewith. These variations in the notification conditions may be desired to account for the variations in job responsibilities assigned to each recipient. For example, a system engineer directly responsibility for the operation of the processing tools 105(1–n) in the manufacturing system 100 may wish to be informed of all faults, regardless of the associated fault severity level. In contrast, a supervisor of the system engineer may not wish to be informed of all the faults, but rather be notified of only the faults with a "high" fault severity level. Extending this example one step further, a senior supervisor may wish to be notified of only the faults with a "very high" fault severity level, and so forth.

Figure 7:
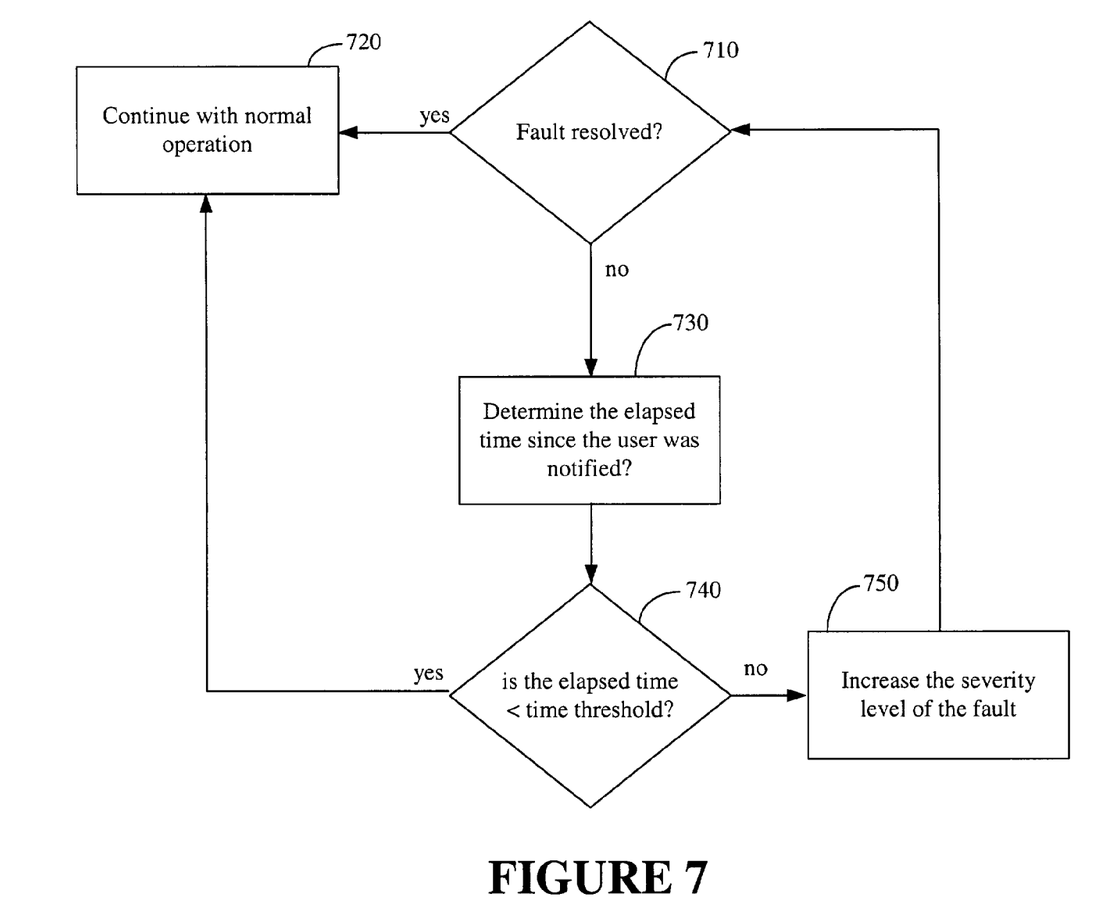
FIG. 7 illustrates a flow diagram of a method for modifying the fault severity level of faults that are detected in the manufacturing system of FIG. 1, in accordance with one embodiment of the present invention.

Referring now to FIG. 7, a flow diagram of a method that may be employed in the fault detection and notification unit 122 is illustrated, in accordance with one embodiment of present invention. In particular, and as described below, the flow diagram of FIG. 7 illustrates a method of modifying the fault severity level of a detected fault. The fault detection and classification module 125 determines (at 710) if a detected fault has been resolved (i.e., cured since the last notification was sent). In one embodiment, the fault detection and classification module 125 may determine whether the fault has been resolved based on an entry stored in the fault detection and notification unit 122, for example. That is, the administrator, in one embodiment, may update the entry to reflect that the fault has been resolved. The fault detection and classification module 125 may periodically check the updateable entry to determine if the fault has been resolved.

If it is determined (at 710) that the fault has been resolved, then the fault detection and classification module 125 continues (at 720) with normal (or other) operations. If, however, it is determined (at 710) that the fault has not been resolved, then the fault detection and classification module 125 determines (at 730) the amount of time that has elapsed since the one or more recipients were last notified of the fault. If it is determined (at 740) that the elapsed time is less than a preselected threshold time value, then the fault detection and classification module 125 continues (at 720) with normal (or other) operations. If, however, it is determined (at 740) that the elapsed time is greater than the preselected threshold time value, then the fault detection and notification module 125 increases (at 750) the severity level of the fault by incrementing the existing fault severity level stored in the field 520(4) of the fault database 126 by one. Thus, in accordance with one embodiment of the present invention, the fault severity level associated with a detected fault may increase over time if the fault is not addressed within the time defined by the preselected threshold time value. And, as the severity level of the fault increases, different recipients may start receiving the fault notifications because the higher fault severity level may satisfy the notification condition (defined in the second field 620(2) of the database 128 of FIG. 6) that is associated with the recipients listed in the first field 620(1) of the database 128 of FIG. 6. In one embodiment, the fault detection and classification module 125 may retransmit a notification to the intended recipient without increasing the severity level of the fault.

Figure 8:
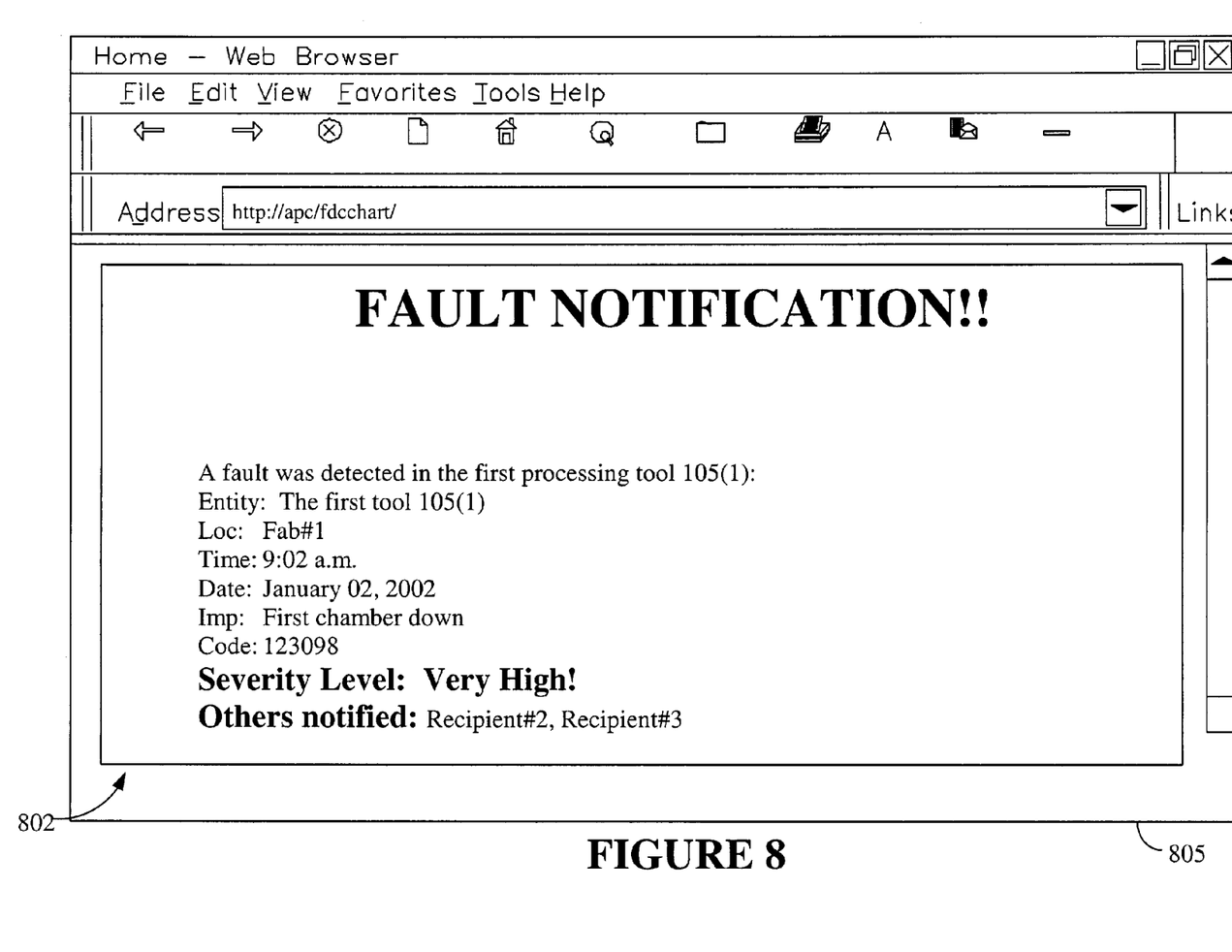
FIG. 8 illustrates exemplary fault notification displayed on a communications device that is adapted to receive information relating to faults that are detected in the manufacturing system of FIG. 1, in accordance with one embodiment of the present invention.

FIG. 8 illustrates exemplary fault-related information displayed on the communications device 145 of the recipient. In particular, FIG. 8 illustrates an exemplary web page 802, which is shown in a browser window 805 that may be shown on a display device of the communications device 145. As can be seen, the fault-related information illustrates that the first processing tool 105(1), located at fab#1, experienced a fault (123098) at 9:02 a.m. on Jan. 2, 2002, and, as a result of the detected fault, the first chamber of the processing tool 105(1) is inoperable. The fault-related information also indicates that the fault severity level of the detected fault is "very high" and that Recipient#2 and Recipient#3 have also been notified of this fault. In one embodiment, the other intended recipients of the fault-related information may be identified based on the contents of the database 128. In FIG. 8, by way of example, the fault-related information includes a variety of useful information. Of course, in other embodiments, the fault-related information may include additional or less information, depending on the implementation.

One or more embodiments of the present invention allow the fault detection and notification unit 122 to notify selected recipients based on the severity level of the fault. Furthermore, as described above, under some conditions, the severity level of the faults may be changed, which in turn may change potential recipients who are notified of the fault. Accordingly, notifying recipients based on the severity level of the fault enables the fault detection and notification unit 122 to reach the appropriate personnel so that the more urgent faults, for example, may be attended to in a timely manner.

The various system layers, routines, or modules may be executable by the control units 121, 123 (see FIG. 1). As utilized herein, the term "control unit" may include a microprocessor, a microcontroller, a digital signal processor, a processor card (including one or more microprocessors or controllers), or other control or computing devices. The storage unit 124 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system, comprising:
  a processing tool adapted to process a semiconductor device; and
  a fault notification module adapted to:
    detect a fault associated with the processing tool;
    identify at least one user to identify the fault based on a fault severity level; and
    transmit information related to the fault to the at least one selected user; and
  an advanced process control framework coupled between the processing tool and the fault notification module.

* * * * *